July 5, 1949.  G. T. KODAMA ET AL  2,475,144
CAPACITOR
Filed May 31, 1946
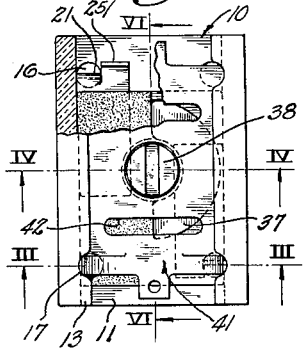
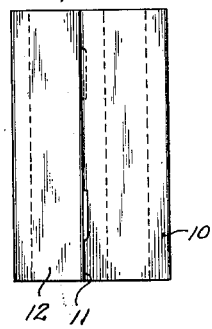
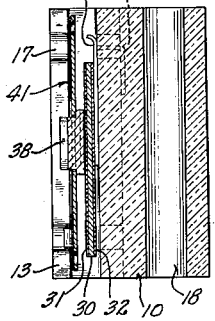
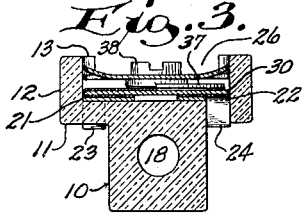
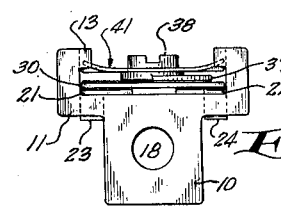
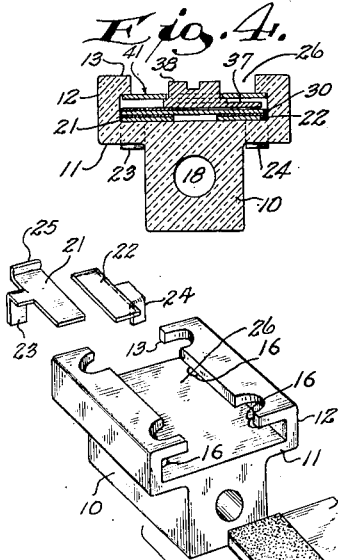
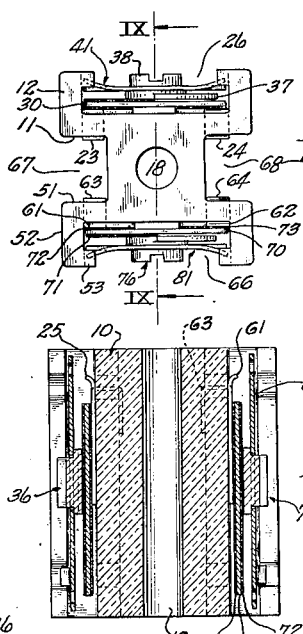
INVENTORS.
GEORGE T. KODAMA.
GEORGE M. EHLERS.
BY
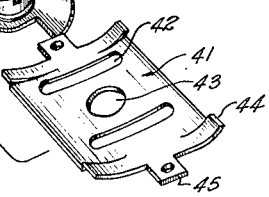
ATTORNEY.

Patented July 5, 1949

2,475,144

UNITED STATES PATENT OFFICE 2,475,144

CAPACITOR

George T. Kodama and George M. Ehlers, Milwaukee, Wis., assignors to Globe-Union Inc., Milwaukee, Wis., a corporation of Delaware Application May 31, 1946, Serial No. 673,469

13 Claims. (Cl. 175—41.5)

This invention relates to improvements in electrical capacitors, and particularly to capacitor structures in which a plurality of combinations of capacitance can be obtained.

An object of the present invention is to provide an electric capacitor which will serve either as a fixed capacitance, a variable capacitance or both fixed and variable capacitances, or in various combinations of capacitance.

Another object of the invention is to provide a capacitor in which the dielectric member and the conductive plates mounted or supported thereon may be readily changed or replaced without disturbing the circuit connections.

Another object of the invention is to provide a capacitor in which a single element serves both to press the adjacent conductive portions into contact with each other and to lock the various elements of the structure in their assembled relation.

A further object of the present invention is to provide a capacitor with a minimum number of simple parts and which may be readily assembled and disassembled to produce any desired combinations of fixed and variable capacitance.

And a further object of the invention is to provide a capacitor structure in which a plurality of units may be readily "banked" or combined to provide any desired multiple of capacitance in any desired combination thereof.

Objects and advantages other than those above set forth will be apparent from the following description when read in connection with the accompanying drawings, in which:

Fig. 1 is a top plan view of a capacitor according to the present invention, with portions of the structure broken away;

Fig. 2 is an end elevation of the present capacitor;

Fig. 3 is a cross section taken on the plane of line III—III of Fig. 1;

Fig. 4 is a cross section taken on the plane of the line IV—IV of Fig. 1;

Fig. 5 is a side elevation of the present capacitors;

Fig. 6 is a longitudinal section on the plane of the line VI—VI of Fig. 1;

Fig. 7 is an "exploded" view in perspective of the present structure to show the relationships of various elements thereto;

Fig. 8 is an end elevation showing a modification of the present invention in which portions thereof are duplicated; and Fig. 9 is a transverse section taken on the plane of line IX—IX of Fig. 8.

Generally, the present structure comprises a body of insulating material bearing connector or terminal elements for contact with stationary conductive plates on a dielectric plate which may be readily assembled with and disassembled from the body. For use as a fixed condenser, a second stationary conductive plate is applied on another side of the dielectric, and, for use as a variable condenser, a rotor plate member is held in contact with an unplated portion of the dielectric. Assembly of the parts is made simple by the interrelated shaping of the parts and the provision of a stop limiting relative movement of the parts in one direction. A resilient member presses and locks all the assembled elements in a given position in the body.

Referring more particularly to the drawing, the numeral 10 designates a body member preferably formed with flanges 11 extending laterally a relatively large and material distance from the body and severally having a portion 12 extending at right angles to the flanges 11 and with flange edge portions 13 extending from the flange portions 12 toward each other, the several flange portions defining an open-ended groove with reentrant or undercut side walls. The flanged portion 11 is apertured, as indicated at 16, and the flange edges or reentrant portions 13 are notched, as shown at 17. It will be understood that the apertures 16 may also be formed in the body 10 itself and may extend in various directions therethrough as will be apparent from the following description. The body 10 is formed with a hole 18 therethrough to receive a mounting bolt or screw, but it will be understood that such hole may be eliminated, placed transversely of the body or may be otherwise located as most convenient.

Terminals 21 and 22 in the form of conductive strips of relatively small size, and provided with lugs 23 and 24 extending at right angles to the main portion of the strips, are placed in the body groove 26 with the lugs extending through the apertures 16 to provide points to which electric circuit conductors may be readily attached. It will be seen that the lugs extend on opposite sides of the body 10 and beneath flanges 11 where they are somewhat protected and are spaced and insulated from each other by the body. The lugs may be bent in various shapes after emerging from the apertures 16, thereby fixing the position of the terminals relative to the body, and may be extended in any direction and for any distance desired for convenience in making circuit connections thereto. The terminal 21 has one end within the reentrant groove 26 bent at an angle to the major portion of the terminal to provide a stop for another element of the capacitor which is to be inserted in the groove over the terminals.

A member 30 of material having suitable dielectric and other properties, and of a size to fit readily into the body of the groove and under the reentrant edges thereof, has applied thereto one or more conductive plates to serve as the opposed plates of a fixed capacitor or the stator plates of a variable capacitor. In the present embodiment a plurality of plates are employed, the plates 31 and 32 forming the conductive plates of a fixed capacitance and the plate 33 forming the stator plate of a variable capacitance, and such plates may be separate elements, may be mounted on or may be formed on the dielectric member 30. It will be understood that various combinations of plates may be applied to the dielectric as will appear from the following description. The dielectric 30 is preferably of ceramic material and the plates 31, 32, and 33 are preferably metallic coatings applied by any of the well-known methods to provide a substantially integral dielectric and conductive plate structure.

The conductive coating 33 is adapted to coact with a rotatable member, generally designated 36, and forming the rotor plate of a variable capacitance. Such rotor member is shown as comprising a plate portion 37 of conductive material joined to a boss or button portion 38 with a slot for turning the member as a whole. However, it will be understood that such member may be made as an integral casting, a stamping, or in any other manner.

All of the above described capacitor elements are held in position by a presser member 41 of leaf or sheet-like form and of resilient material. The presser is made slightly arcuate in form and of such size as to fit into the body groove 26 and well into the undercut portion thereof. Thus when the presser is inserted in the groove with the dielectric and its conductive coatings, and with the rotor positioned under the presser as shown, the coatings are pressed on the terminals and the rotor is pressed on the dielectric at relatively constant and high pressure. The resilience of the presser member is increased by slots 42 and an aperture 43 through which the rotor boss 38 extends. If the aperture 43 is of such size as to be a snug fit for the boss 38, the rotor plate portion 37 may be made truly semi-circular, thus providing the most desirable characteristics for a variable capacitance.

The presser 41 is slit inwardly from opposite edges thereof and adjacent the ends of the presser member to provide finger portions 44 engageable in the notches 17 in the reentrant flange edge portions 13. The stop 25 on terminal 21 determines the position of the parts upon assembly, and the fingers 44 lock such parts in assembled position unless the fingers are voluntarily depressed while the presser is being moved out of the groove. The presser member is provided with lugs 45 at the ends as terminals for rotor plate 37 and for other purposes.

When the construction above described is to be used as both a fixed and variable capacitance, connections are made to the plates 31, 32 by way of the terminals 21 and 45 for use as a fixed capacitance, and connections are made to the plate 33 by way of the terminal 22 and to the rotor 36 by way of the terminal 45 for obtaining variable capacitance. When only variable capacitance is desired, as for example when the structure is used as a trimmer condenser, only the plate 33 and the rotor 36 are required and the plates 31, 32 may be entirely omitted or may be present and remain disconnected.

The structure shown in Figs. 8 and 9 differs from that above described only in the provision of flanges 51, 52, 53, duplicating the flanges 11, 12, and 13, on opposite sides of the body 10, and therefore provides a body with duplicate reentrant grooves 26 and 66 in which duplicate capacitor elements similar to those above described may be provided in each groove as shown. One groove may be used as a fixed capacitance only while the other groove is utilized only as a variable capacitance, or the capacitors may be combined as fixed and variable capacitances in any manner desired. The reentrant grooves coact in forming a pair of straight walled grooves 67 and 68 also on opposite sides of the insulating body, the purpose of which will appear hereinafter.

Being duplicates of each other, only the major elements of the duplicate structure are identified. Thus the duplicate terminals are designated 61, 62, with lugs 63, 64, respectively, the duplicate dielectric is marked 70, and the duplicate coatings on the dielectric are marked 71, 72, and 73, while the variable capacity rotor is designated 76 and the duplicate presser member is designated 81. The lugs 23, 63, and 24, 64 from the several reentrant grooves are brought, in pairs as indicated, into the same straight-walled grooves. Hence, such terminals may be readily interconnected, if desired, with the connecting points partially inclosed and shielded. If suitable apertures are provided from the reentrant grooves through the body portion 10 into the straight-walled grooves, it is possible to interconnect the four or more different capacitances in varying combinations.

It will be seen from the above description that the present construction provides either a combination of fixed and variable capacitors or fixed or variable capacitors alone. The several elements of the structure are readily assembled by forming one of the parts with a simple stop and are held in assembled relation under pressure and locked in position by the same element. The individual parts are especially simple and may be interchanged by any one to secure the capacitance combinations desired, and such change can be made by breaking the connections of only lug 45 to the electric circuit.

In the structure shown in Figs. 8 and 9 it is not only possible to obtain additional combinations of fixed and variable capacitors, as compared to the structure in Figs. 1 to 7, inclusive, but the structure of Figs. 8 and 9 has the further advantages that pairs of reentrant flanges on opposite sides of the insulating body or block coact in defining straight-walled grooves into which the lugs from the terminals may extend and which provide mechanical shields for and partially inclose the spaces in which the connections to the circuit conductors are to be made. Thus it is easy to make the connections of capacitors in different reentrant grooves in the same straight-walled groove or in different straight-walled grooves, as desired. It is, of course, also possible to bring the terminals of all of the capacitors into the same straight-walled grooves from one or both of the reentrant grooves.

Although but a few embodiments of the present invention have been illustrated and described, it will be apparent to those skilled in the art that various changes and modifications may be made

We claim:

1. In an electric capacitor, a body of insulating material having reentrant flanges defining a groove, the reentrant edges of the flanges having notches therein, a terminal mounted in the groove and having a portion extending therefrom, a dielectric member fitting into the groove, conductive plates supported by the dielectric member, and a resilient presser member engaging under the reentrant portions of the flanges and in the notches thereof for retaining the dielectric member and the plates in a predetermined position in the groove.

2. In an electric capacitor, a body of insulating material with reentrant flanges defining a groove, the reentrant edges of the flanges having notches therein, a terminal mounted in the groove and having a portion extending therefrom, a dielectric member fitting into the groove, conductive plates mounted on the dielectric member, an arcuate leaf spring engaging under the reentrant portion of the flanges and having finger portions engaging in the notches in the flange edges to retain the dielectric member and the plates in the groove under pressure.

3. In an electric capacitor, a body of insulating material with reentrant flanges defining a groove, the reentrant edges of the flanges having notches therein, a terminal strip mounted in the groove and having a portion extending therefrom, a dielectric member fitting into the groove, conductive plates supported by the dielectric, one end of the terminal portion in the groove being bent to form a stop against movement in one direction of the dielectric member in the groove beyond a given position, an arcuate leaf spring engaging under the reentrant portion of the flanges and having finger portions engaging in the notches in the flange edges to retain the dielectric member and the plates in the groove under pressure.

4. In an electric capacitor adapted to be connected to circuit conductors, a body of insulating material having an aperture therein and having reentrant flanges defining a groove, a terminal mounted in the groove and having a lug extending therefrom through the body aperture for positioning the terminal in the groove and for connection of a circuit conductor thereto, a dielectric member fitting in the groove, conductive plates supported by the dielectric, and an arcuate leaf spring engaging the reentrant portions of the flanges for pressing the dielectric member and the plates on the terminal.

5. In an electric capacitor adapted to be connected to circuit conductors, a body of insulating material having reentrant flanges defining a groove and having an aperture therethrough, a terminal mounted in the groove and having a lug extending therefrom through the flange aperture for positioning the terminal in the groove and for connection of a circuit conductor thereto, a dielectric member fitting in the groove, conductive plates mounted on the dielectric, and an arcuate leaf spring engaging the flanges for pressing the dielectric member and one of the plates on the terminal.

6. In an electric capacitor, a body of insulating material having reentrant flanges defining a groove, the reentrant edges of the flanges having notches therein, a dielectric member fitting into the groove, a plurality of conductive plates mounted on opposite sides of the dielectric to form a fixed capacitance, a terminal in the groove for contact with one of the plates, and an arcuate leaf spring engageable under the reentrant portion of the body flanges for pressing the plate adjacent to the terminal into contact therewith and for holding the dielectric member, the plates, and the terminal in predetermined position in the groove.

7. In an electric capacitor, a body of insulating material having a groove formed therein, a terminal mounted on the body, a dielectric member fitting into the groove, a conductive plate mounted on the dielectric and in contact with the terminal, a rotor coacting with the conductive plate to form a variable capacitor, and a presser member engaging in the groove and pressing the plate on the terminal and the rotor on the dielectric, the presser member being apertured for access to the rotor for changing the position thereof.

8. In an electric capacitor, a body of insulating material having a groove formed therein, a terminal mounted on the body, a dielectric member fitting into the groove, a conductive plate supported by the dielectric and in contact with the terminal, a rotor having a plate portion forming one conductor of a variable capacitor and a boss portion, and an apertured pressure member engaging in the groove and pressing the plate on the terminal and the rotor plate portion on the dielectric, the rotor boss extending through the presser member aperture and engageable to change the position of the rotor.

9. In an electric capacitor, a body of insulating material having a groove formed therein, a dielectric member fitting into the groove, a plurality of conductive plates supported on one side of the dielectric, a plurality of terminals mounted in the groove for contacting severally with the plates, a conductive plate supported on another side of the dielectric to coact with one of the first said plates in forming a fixed capacitance, a rotor member engaging with the dielectric on one side thereof and coacting with another of the first said plates in forming a variable capacitance, and a presser member engaging in the groove for pressing the first said plates on the terminals and pressing the rotor on the dielectric.

10. In an electric capacitor, a body of insulating material having reentrant flanges thereon defining a groove with undercut side walls and with notches in the reentrant edges of the flanges, a dielectric member fitting into the groove, a plurality of conductive plates supported on one side of the dielectric, a plurality of terminals mounted in the groove for contact severally with the plates, a conductive plate supported on another side of the dielectric to coact with one of the plurality of plates in forming a fixed capacitance, a rotor member engaging with the dielectric on one side thereof and coacting with another of the plurality of plates to form a variable capacitance, and an apertured arcuate leaf spring engaging in the undercut of the groove side walls to press the plurality of plates on the terminals and to press the rotor on the dielectric, the spring being slit to form fingers engageable in the flange notches to fix the positions of the parts pressed thereby and of the spring, a portion of the rotor extending through the spring aperture for varying the position of the rotor relative to the said another of the plurality of plates.

11. In an electric capacitor, a body of insulating material having a groove formed therein and having apertures therethrough, a dielectric member fitting into the groove, a plurality of conductive plates supported on one side of the dielectric, a plurality of conductive strips in the groove for contacting severally with the plates and having lugs extending through the body apertures to form terminals and to fix the positions of the strips in the groove, a conductive plate supported on another side of the dielectric to coact with one of the first said plates in forming a fixed capacitance, a rotor member engaging with the dielectric on one side thereof and coacting with another of the first said plates in forming a variable capacitance, and an apertured leaf spring engageable with the sides of the body groove to press on the plates and the dielectric and the rotor and to fix the position thereof relative to the contact strips, a portion of the rotor extending through the spring aperture for varying the position of the rotor relative to the said another of the first said plates.

12. In an electric capacitor, a body comprised of insulating material, a dielectric member mounted on the body and having a plurality of conductive plates on one side thereof, a plurality of terminals mounted on the body for contacting severally with the plates, a conductive plate on another side of the dielectric to co-act with one of the first said plates in forming a fixed capacitance, a rotor member engaging with the dielectric on one side thereof and co-acting with another of the first said plates in forming a variable capacitance, and a presser member co-acting with the body for pressing the first said plates on the terminals and pressing the rotor on the dielectric.

13. In an adjustable capacitor, a dielectric member, a plurality of conductive plates fixed to one side of said member, each of said plates having a terminal connected thereto whereby said capacitor may be connected to the conductors of an electric circuit, a conductive plate fixed to the opposite side of said member in opposing relation to one of said first conductive plates to form a capacitance therebetween, a movable conductive plate in engagement with said last named conductive plate and coacting with the other of said first conductive plates to form a variable capacitance, and means for maintaining said movable conductive plate in engagement with said last named fixed conductive plate.

GEORGE T. KODAMA.
GEORGE M. EHLERS.

REFERENCES CITED

The following references are of record in the file of this patent:

UNITED STATES PATENTS

| Number | Name | Date |
|---|---|---|
| Re. 17,916 | Proctor | Dec. 30, 1930 |
| 1,553,549 | Priess | Sept. 15, 1925 |
| 1,633,019 | Huth | June 21, 1927 |
| 2,021,582 | Poitras | Nov. 19, 1935 |
| 2,112,815 | Perret | Mar. 29, 1938 |
| 2,163,237 | Flanzer | June 20, 1939 |
| 2,179,068 | Sprague | Nov. 7, 1939 |
| 2,370,722 | Ehlers | Mar. 6, 1945 |

FOREIGN PATENTS

| Number | Country | Date |
|---|---|---|
| 452,573 | Great Britain | Aug. 25, 1936 |
| 467,750 | Great Britain | June 23, 1937 |
| 518,127 | Great Britain | Feb. 19, 1940 |